(12) United States Patent
Fegg

(10) Patent No.: US 7,028,571 B2
(45) Date of Patent: *Apr. 18, 2006

(54) LUBRICATION SYSTEM AND METHOD OF LUBRICATING AN INTERNAL-COMBUSTION ENGINE

(75) Inventor: Stefan Fegg, Korntal-Münchingen (DE)

(73) Assignee: Harley Davidson Motor Company Group, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/091,090

(22) Filed: Mar. 28, 2005

(65) Prior Publication Data

US 2005/0166694 A1    Aug. 4, 2005

Related U.S. Application Data

(63) Continuation of application No. 10/460,520, filed on Jun. 12, 2003, now Pat. No. 6,910,398, which is a continuation of application No. 10/017,900, filed on Dec. 14, 2001, now Pat. No. 6,604,608.

(30) Foreign Application Priority Data

Dec. 22, 2000  (DE) ................................ 100 64 528

(51) Int. Cl.
*F16H 57/04* (2006.01)

(52) U.S. Cl. ........................... 74/359; 74/467; 180/6.12

(58) Field of Classification Search .................. 74/467; 184/6.12, 11.1, 11.2
See application file for complete search history.

(56) References Cited

U.S. PATENT DOCUMENTS 3,467,221 A    9/1969  Janke

| 3,508,630 | A | * | 4/1970 | Keller et al. ................... 74/467 |
| 4,329,887 | A | * | 5/1982 | Kawamoto ................... 74/467 |
| 4,834,219 | A | | 5/1989 | Inagaki et al. |
| 5,158,152 | A | * | 10/1992 | Nemoto et al. ............... 74/467 |
| 5,588,405 | A | | 12/1996 | Sawa et al. |
| 5,799,540 | A | | 9/1998 | Diehl et al. |
| 6,223,858 | B1 | * | 5/2001 | Ubagai et al. ............. 184/11.2 |

FOREIGN PATENT DOCUMENTS

| DE | 4304743 C2 | 8/1994 |
| EP | 0059396 A2 | 9/1982 |
| GB | 2008673 A | 6/1979 |
| GB | 2045864 A | 11/1980 |
| JP | 54-60167 | 10/1977 |
| JP | 57-140426 | 2/1981 |

(Continued)

*Primary Examiner*—Sherry Estremsky
(74) *Attorney, Agent, or Firm*—Michael Best & Friedrich LLP

(57) ABSTRACT

An apparatus and method for lubricating an internal-combustion engine includes a shaft extending through a gearbox, a gear and a sliding sleeve coupled to rotate with the shaft and adapted to move axially along the shaft, a gearshift fork in mating engagement with the sliding sleeve and moveable parallel to the shaft, a rib in the gearbox adjacent the shaft, and a duct extending into the gearbox. The duct preferably directs a lubricant onto the gearshift fork and the sliding sleeve. Preferably, the rib directs the lubricant from the duct onto the gearshift fork and the sliding sleeve. In an alternative embodiment, at least some of the lubricant flung from the shaft, gear, and sliding sleeve contacts the rib and is directed onto the sliding sleeve and the gearshift fork. Further preferably, a projection extends from the rib to direct the lubricant onto the sliding sleeve and the gearshift fork.

15 Claims, 4 Drawing Sheets

FOREIGN PATENT DOCUMENTS

| | | |
|---|---|---|
| JP | 58-80664 | 11/1981 |
| JP | 58074957 A | 5/1983 |
| JP | 08061468 A | 3/1996 |
| JP | 10299876 A | 11/1998 |
| JP | 11 118029 | 4/1999 |
| JP | 2000284371 A | 10/2000 |

* cited by examiner

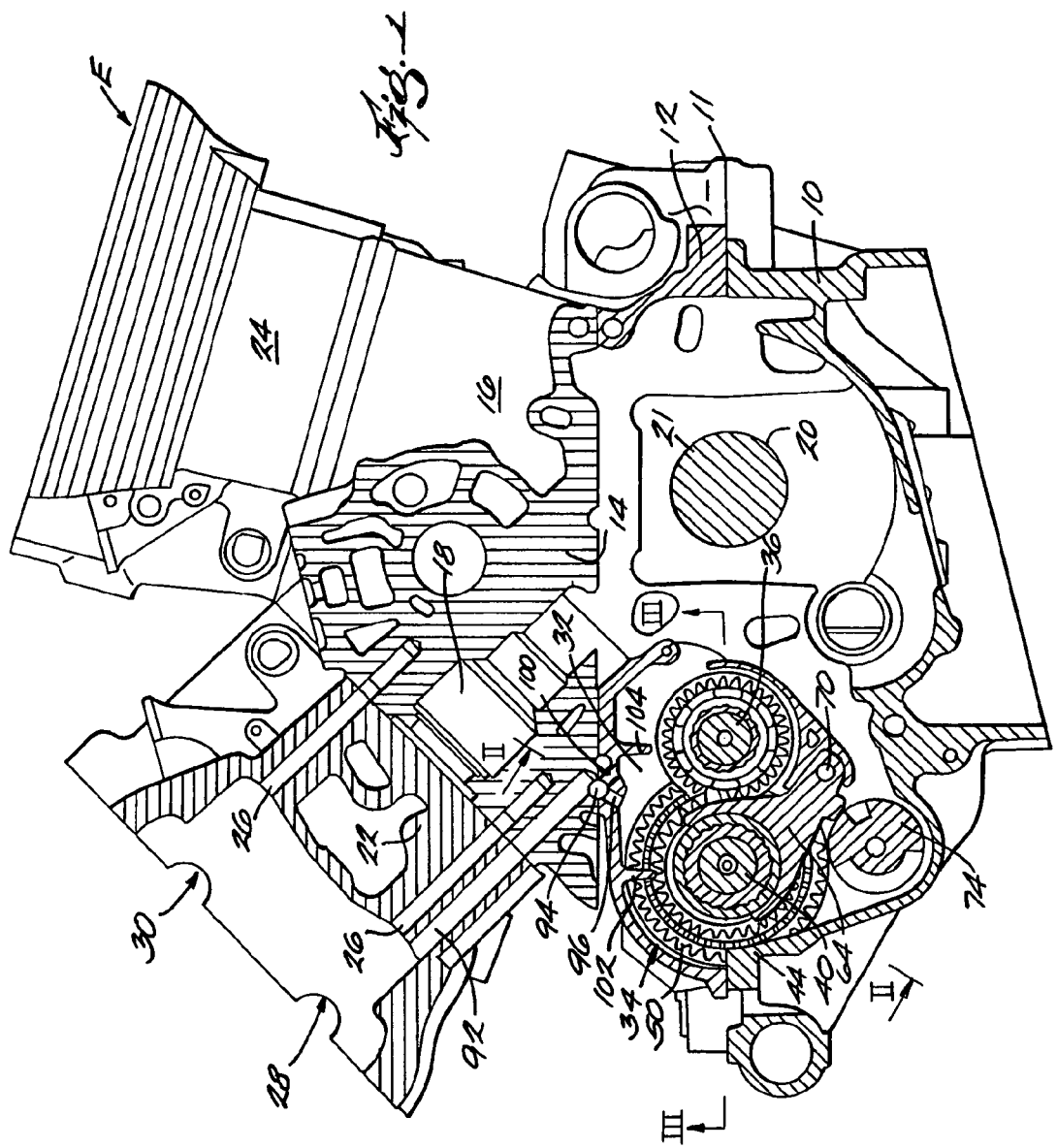

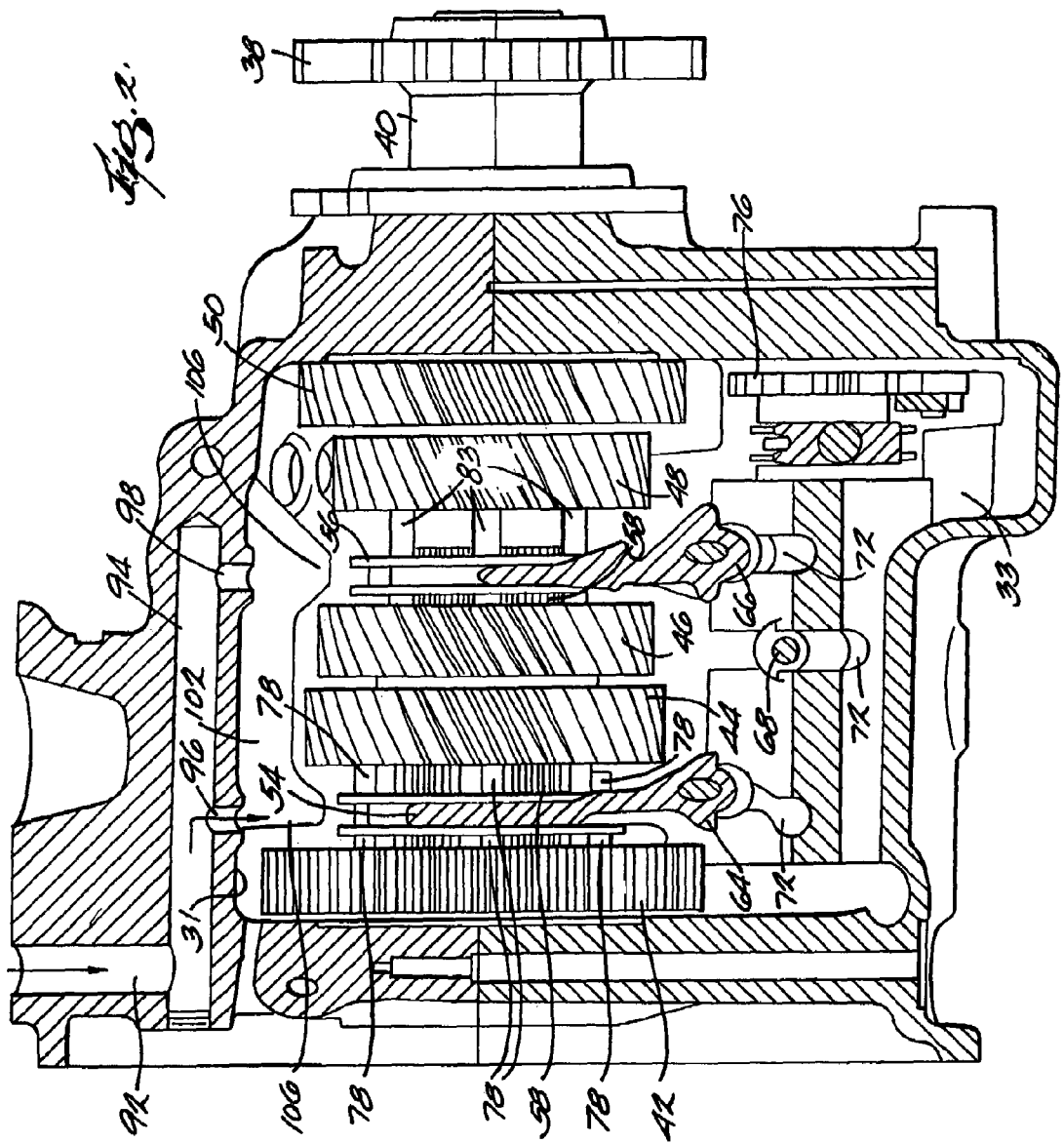

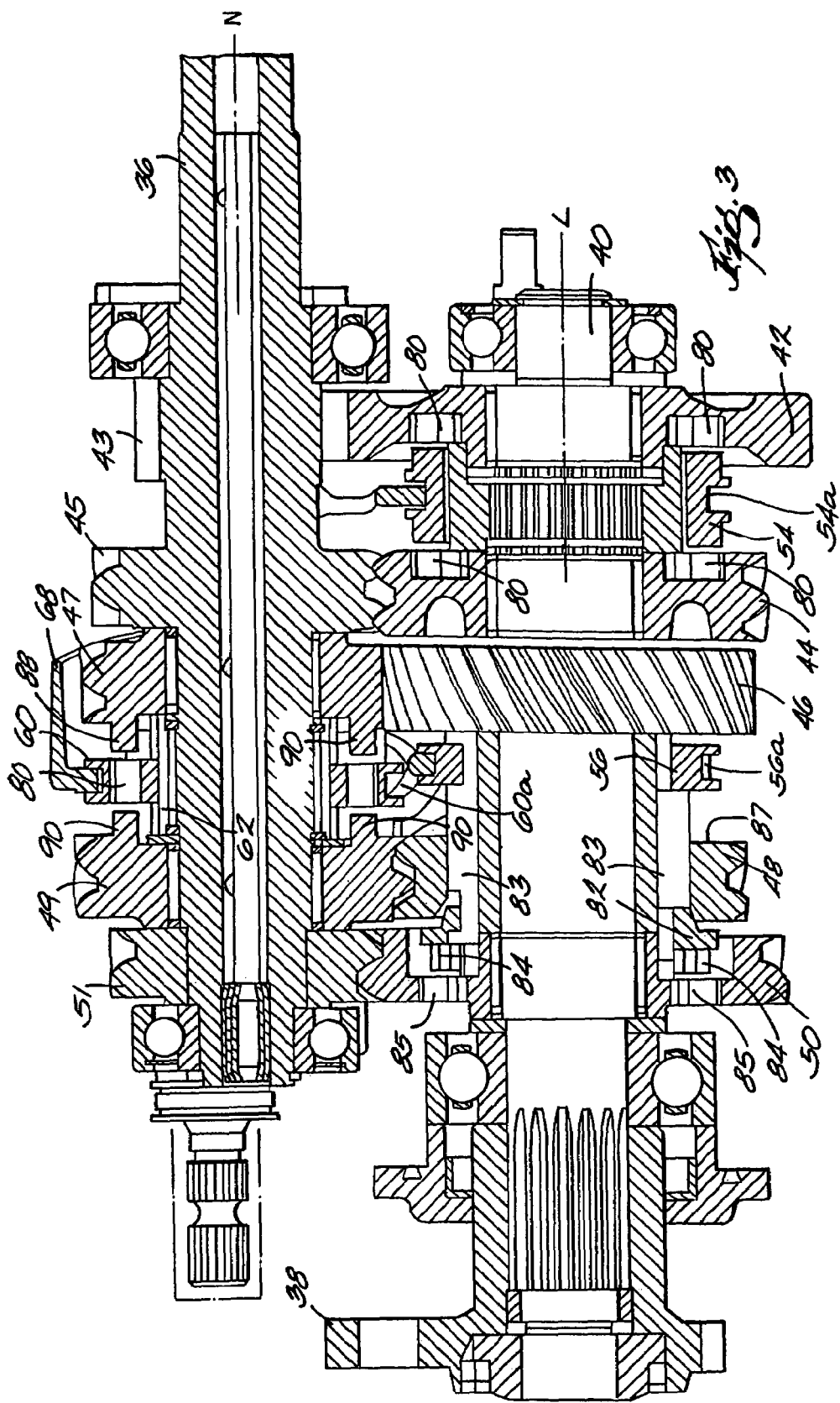

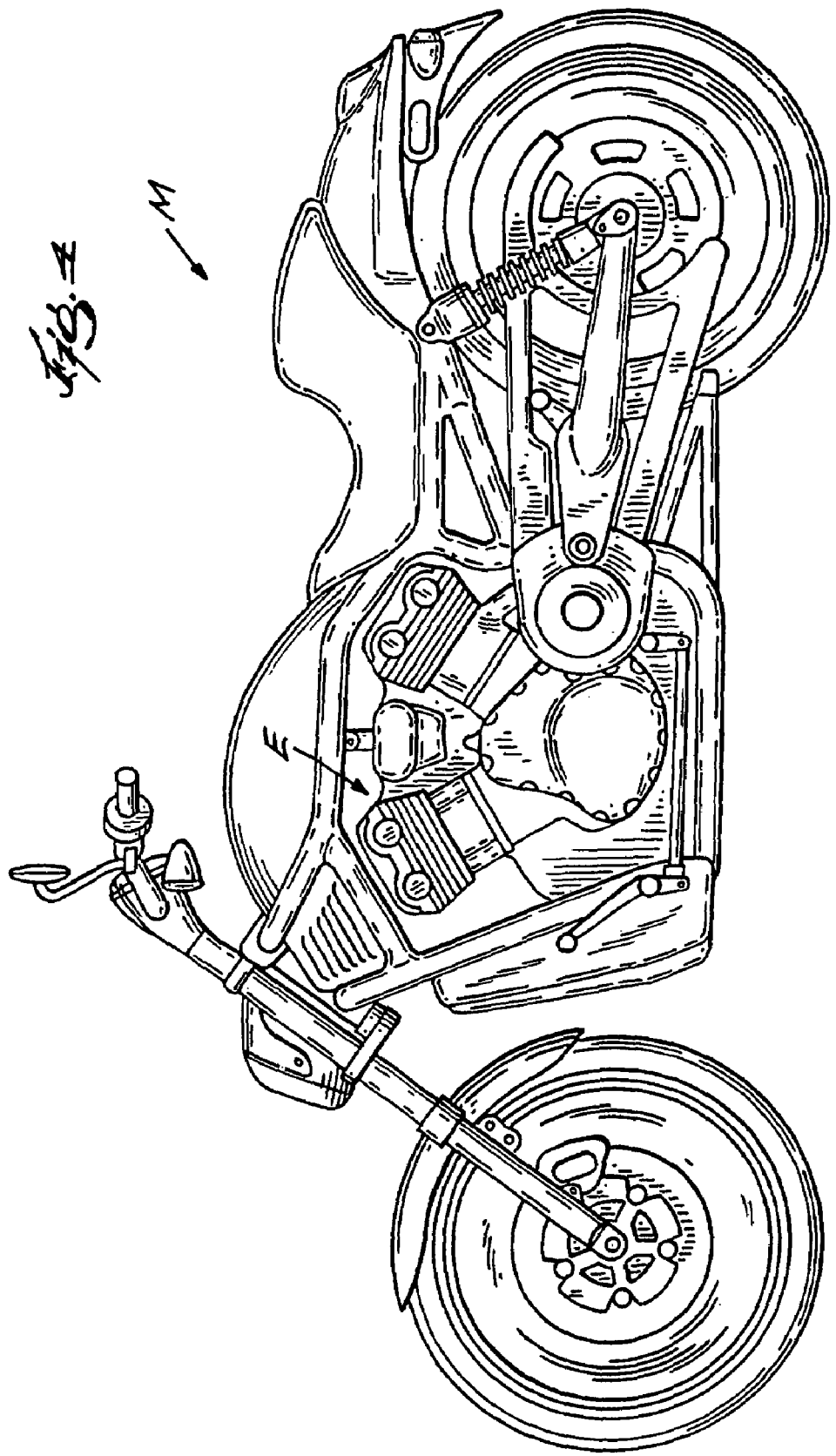

LUBRICATION SYSTEM AND METHOD OF LUBRICATING AN INTERNAL-COMBUSTION ENGINE

CROSS-REFERENCE TO RELATED APPLICATIONS

This Application is a continuation of U.S. application Ser. No. 10/460,520, filed Jun. 12, 2003, now U.S. Pat. No. 6,910,398, which is a continuation of U.S. application Ser. No. 10/017,900, filed Dec. 14, 2001, now U.S. Pat. No. 6,604,608, which claimed priority to German Patent Application No. DE 100 64 528.3, filed Dec. 22, 2000, the entire contents of which are incorporated herein by reference.

FIELD OF THE INVENTION

The invention relates generally to lubrication systems for internal-combustion engines, and more specifically to lubrication systems for use in motorcycle engines.

BACKGROUND OF THE INVENTION

One example of a lubrication system for use with an internal-combustion engine is disclosed in U.S. Pat. No. 5,588,405 issued to Atsushi Sawa. The engine includes a gearbox incorporated into the crankcase. Oil ducts deliver lubricating oil to the camshaft and to the gears within the gearbox. The oil is circulated within the engine between the crankshaft, various oil-consuming devices, and an oil sump by an oil pump.

Additional lubrication is required in engines that have manual gearboxes. In particular, in manual gearboxes the gears are moved or shifted by gearshift sleeves and gearshift forks. The gearshift sleeves are moved axially along one or more shafts by one or more gearshift forks. Friction between the gearshift sleeves, the gearshift forks, and the shafts can cause premature wear in the gearbox. It is therefore desirable not only to supply lubricating oil to the gears and to the shafts within the gearboxes but also to supply lubricating oil to the gearshift sleeves and to the gearshift forks.

SUMMARY OF THE INVENTION

The present invention includes an apparatus and a method for lubricating the gearshift sleeves and the gearshift forks. In conventional engines, oil or some other lubricant is cycled through the engine from the oil sump through the cylinder head and the other oil-consuming devices and back to the oil sump. In the present invention, some of the oil is diverted from this lubrication cycle to the gearbox to provide lubrication for the gears, shafts, gearshift sleeves, gearshift forks, and other elements within the gearbox. Additionally, the present invention requires few additional components because the present invention utilizes the existing lubrication cycle, including the oil pump and oil sump to supply oil to the gearbox.

In the present invention, a shaft extends into a gearbox. A number of gearshift sleeves are arranged axially along the shaft adjacent a number of gears. A corresponding number of gearshift forks are arranged axially along the shaft within the gearbox for shifting the gearshift sleeves along the shaft. The gearshift forks are configured to engage the gearshift sleeves and to move the gearshift sleeves along the shaft. Oil enters the gearbox through an oil duct, which extends through the wall of the gearbox. Preferably, an oil intake channel extends through the cylinder head housing and into the wall of the gearbox. A transverse oil duct is preferably situated in the wall of the gearbox and receives oil from the oil intake channel and distributes the oil through the oil bores to the gearbox. Preferably, a plurality of oil ducts extend into the gearbox to direct oil into the gearbox and to direct oil onto the gearshift forks and onto the gearshift sleeves.

A rib preferably extends from the wall of the gearbox into a cavity in the gearbox. The rib is preferably contoured to closely engage the plurality of gears within the gearbox. As the gears and gearshift sleeves rotate about the shaft, the gears, and the gearshift sleeves fling oil against the gearbox wall. The rib collects at least some of the oil that is flung off of the gears and the gearshift sleeves as they rotate within the gearbox. The rib then directs this oil back onto the gearshift forks and the gearshift sleeves, thereby lubricating the gearshift forks and the gearshift sleeves. Preferably, the rib is positioned adjacent at least one of the oil ducts so that oil which exits the oil ducts flows across the rib. In this manner, the rib can direct the oil from the oil ducts onto the gearshift forks and the gearshift sleeves.

In a second aspect of the present invention, the gearbox includes two relatively parallel shafts. Gears and gearshift sleeves are affixed to both shafts so that the gears intermesh, transmitting power from the first shaft to the second shaft. Preferably, a first and a second rib are positioned within the gearbox with one rib adjacent each of the first and second shafts. In this manner, the first rib can direct oil onto the first shaft and the elements which are mounted on or relatively near the first shaft such as the gearshift forks and the gearshift sleeves. In a similar manner, the second rib can direct oil onto the second shaft and the elements which are mounted on or relatively near the second shaft such as the gearshift forks and the gearshift sleeves. Preferably, the second rib is positioned adjacent at least one oil duct so that oil which exits the oil ducts flows across the second rib. In this manner, the second rib can direct oil from the oil ducts onto the gearshift forks and the gearshift sleeves of the second shaft.

Preferably, a plurality of projections extend from the ribs into the gearbox, each projection being adjacent a gearshift sleeve and/or a gearshift fork. In this manner, the oil, which is collected on the ribs, drains off of the ribs and is then directed onto the gearshift sleeves and the gearshift forks by the projections. Additionally, some of the oil that is flung off of the gears and the gearshift sleeves contacts the projections. The projections direct this oil onto the gearshift sleeves and the gearshift forks.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 1 is a section view of an internal-combustion engine with a gearbox incorporated in the crankcase;

FIG. 2 is a section view taken along line II—II in FIG. 1;

FIG. 3 is a section view taken along line III—III in FIG. 1; and

FIG. 4 is a perspective view of a motorcycle having an internal combustion engine embodying the invention.

DETAILED DESCRIPTION

The present invention is described herein as including a four-stroke two-cylinder engine. However, the present invention can be used with almost any number of cylinders, such as one, two, three, four, five, and six cylinders with equal effectiveness. Similarly, the present invention can be used with two-stroke engines. Reference is made to engines having a V-shape. One having ordinary skill in the art will appreciate that the present invention can be used with V-shaped engines and with in-line or straight engines with equal effectiveness. Also, the present invention is described herein as including a five-speed gearbox or a five-speed transmission. However, the present invention can be used with almost any number of gearing options, including one, two, three, four, five, and six speed transmissions with equal effectiveness. Similarly, the present invention can be used with equal effectiveness to provide lubrication to gearboxes or to transmissions with any configuration, including manual or automatic transmission. As such, the present invention can include embodiments in which the configuration of the engine includes any conventional motorcycle engine and is not limited to the embodiments referred to herein. For simplicity only, the following description will continue to refer to five-speed, four-stroke, two-cylinder, V-shaped engines.

Referring to FIGS. 1–3, a crankcase 11 of an internal-combustion engine E has a lower crankcase half 10 and an upper crankcase half 12. The internal-combustion engine E is constructed in the form of a water-cooled, V-shaped engine. In the illustrated embodiment, the internal-combustion engine E is preferably the prime mover for a motorcycle M, as shown in FIG. 4, however, other engine applications are also contemplated. A gearbox sump 33 is located in the lower crankcase half 10. Oil which drains off or is flung off of the gears 42, 43, 44, 45, 46, 47, 48, 49, 50, 51, the sliding sleeves 54, 56, 60, the gearshift forks 64, 66, 68, the gearbox input shaft 36, the gearbox output shaft 40, and the other engine components within the gearbox 34 drains into the gearbox sump 33. From the gearbox sump 33 the oil drains or is moved to the oil sump (not shown). From the oil sump, the oil is drained or pumped to the various oil consuming devices (not shown) within the engine E. Oil that is not consumed by the various oil-consuming devices is returned to the oil sump. In this way, oil is cycled through the engine E along a lubrication cycle (not shown) from the oil sump to the various oil-consuming devices and back to the oil sump.

A first and a second cylinder 14, 16 are located in the upper crankcase half 12 and are arranged in a V configuration. A cooling water chamber 18 is located adjacent the cylinder 14 in the upper crankcase half 12. A crankshaft 21 is received in the opening 20. A first cylinder head 22 and a second cylinder head 24 are coupled to the first and second cylinders 14, 16, respectively. Cylinder head fasteners (not shown) extend into the fastener openings 26 and hold the first and second cylinder heads 22, 24 on the first and second cylinders 14, 16. FIG. 1 also shows the lower halves of camshaft thrust bearings 28, 30 located on the first cylinder head 22. The camshaft thrust bearings 28, 30 open and close the intake and exhaust valves (not shown).

With reference to FIGS. 1 and 2, the gearbox 34 includes a gearbox wall 31 that defines a cavity 32. A gearbox input shaft 36 extends into the gearbox 34. Power is transferred to the gearbox input shaft 36 from the crankshaft 21 by a set of crankshaft gears (not shown). A gearbox output shaft 40 is located within the gearbox 34 and is substantially parallel to the gearbox input shaft 36. Referring to FIG. 3, power is transferred between the gearbox input shaft 36 and the gearbox output shaft 40 by engaging one of the five gears 42, 44, 46, 48, 50 mounted on the gearbox output shaft 40 with one of the five gears 43, 45, 47, 49, 51 mounted on the gearbox input shaft 36. The gears 42, 44, 46, 48, 50 of the gearbox output shaft 40 and the gears 43, 45, 47, 49, 51 engage each other as pairs of gears 42–43, 44–45, 46–47, 48–49, and 50–51.

As shown in FIG. 2, an output flange 38 is coupled to one end of the gearbox output shaft 40. By alternating the arrangement of the gearbox input and/or output shafts 36, 40 different pairs of gears 42, 43, 44, 45, 46, 47, 49, 50, 51 are in meshing engagement. In this manner, the output flange 38 can be rotated at different RPMs (revolutions per minute) or alternatively can transfer more or less power to other elements (not shown) within the engine E.

With reference to FIGS. 2 and 3, the gears 42, 44, and 50 arranged on the gearbox output shaft 40 are designed in the form of idler gears. The gears 42, 44, and 50 are fixed to the gearbox output shaft 40 so that the gears 42, 44, and 50 selectively rotate with the gearbox output shaft 40 about the first longitudinal axis L. The ability of the gears 42, 44, 50 to be selectively rotatable about either the gearbox input or output shafts 36, 40 is what gives the engine E the ability to "shift" or change from one gearing arrangement to another.

As shown in FIG. 3, the gears 43, 45, and 51 are arranged on the gearbox input shaft 36 to engage the gears 42, 44, and 50, respectively. However, the gears 43, 45, and 51 are fixedly connected to the gearbox input shaft 36 so that the gears 43, 45, and 51 rotate with the gearbox input shaft 36 about the second longitudinal axis N.

The gears 47 and 49 are also idler gears (see FIG. 3). The gears 47, 49 are arranged on the gearbox input shaft 36 so that the gears 47, 49 selectively rotate about the second longitudinal axis N with the gearbox input shaft 36. The corresponding gears 46, 48 are fixedly coupled to the gearbox output shaft 40. The gears 46, 48 rotate with the gearbox output shaft 40 about the first longitudinal axis L.

With reference to FIG. 2, the gearbox output shaft 40 is machined or slotted at three locations along its length to define teeth 58. Three gearshift sleeves or sliding sleeves 54, 56, 60 are located within the gearbox 34 to engage the gears 42, 44, 47, 49, 50. In particular, two sliding sleeves 54, 56 are coupled to the gearbox output shaft 40 so that the sliding sleeves 54, 56 can rotate with the gearbox output shaft 40. The sliding sleeves 54, 56 have teeth (not shown) which mate with the teeth 58 on the gearbox output shaft 40. In this manner, the sliding sleeves 54, 56 can move axially along the gearbox output shaft 40. A third sliding sleeve 60, shown in FIG. 3, is coupled to the gearbox input shaft 36 between gears 47, 49. The sliding sleeve 60 also has teeth (not shown) which matingly engage the teeth (not shown) on the gearbox input shaft 36. This arrangement allows the sliding sleeve 60 to move axially along the gearbox input shaft 36. The sliding sleeves 54, 56, 60 have relatively circular cross-sections. Each of the three sliding sleeves 54, 56, 60 have a continuous groove 54a, 56a, 60a around their peripheries.

The continuous grooves 54a, 56a, 60a are contoured to receive three gearshift forks 64, 66, 68 (see FIGS. 2 and 3).

Each of the gearshift forks 64, 66, 68 have two prongs or tines that extend around the sliding sleeves 54, 56, 60. The prongs of the gearshift forks 64, 66, 68 fit into the continuous grooves 54a, 54a, 60a of the sliding sleeves 54, 56, 60, respectively. In this manner, the gearshift forks 64, 66, 68 can engage the sliding sleeves 54, 56, 60 and can move the sliding sleeves 54, 56, 60 axially along the gearbox input and output shafts 36, 40. Also, the sliding sleeves 54, 56, 60 can rotate about the first and second axes L, N with the gearbox input and output shafts 36, 40. The gearshift forks 64, 66, 68 do not rotate about the first and second longitudinal axes L, N.

With reference to FIG. 2, three slide blocks 72 connect the gearshift forks 64, 66, 68 to a common shaft 70. The slide blocks 72 are essentially arms contoured to connect the gearshift forks 64, 66, 68 to the common shaft 70. The slide blocks 72 are also contoured to avoid contacting the gears 42, 43, 44, 45, 46, 47, 48, 49, 50, 51 and the other elements within the gearbox 34. A gearshift roller 74 (see FIG. 1) and a gearshift star wheel 76 (see FIG. 2) are coupled to one end of the common shaft 70. A foot lever (not shown) either directly or indirectly rotates the gearshift roller 74.

In operation, a user depresses the foot lever which rotates the gearshift roller 74 which rotates the continuous shaft 70. The continuous shaft 70 then moves the gearshift forks 64, 66, 68 which move one of the sliding sleeves 54, 56, 60 along the gearbox input or output shafts 36, 40. The sliding sleeves 54, 56, 60 can then align with and engage one of the gears 42, 44, 47, 49, 50 so that one of the pairs 42–43, 44–45, 46–47, 48–49, 50–51 is in rotational engagement. In this manner, by moving the foot lever the user can, for example, shift the motorcycle engine E from first to second or from second to third gears as is well known in the art of transmissions.

So that the sliding sleeve 54 can mate with the gears 42, 44, the sliding sleeve 54 has claws 78. As best seen in FIG. 2, the claws 78 are distributed radially on the two end faces of the sliding sleeve 54, adjacent the gears 42, 44. The claws 78 extend around the periphery of the sliding sleeve 54 and are positioned to be received in corresponding recesses 80 (see FIG. 3) around the periphery of the gears 42, 44.

In a similar manner, recesses 80 (see FIG. 3) are distributed radially around the periphery of the sliding sleeve 60. The gears 47, 49 are coupled to the gearbox input shaft 36 on either side of the sliding sleeve 60. Claws 88, 90 extend axially from the periphery of the gears 47, 49. The claws 88, 90 are adapted to be received in the recesses 80 in the sliding sleeve 60. In this way, the sliding sleeve 60 can engage the gears 47 and 49 along the gearbox input shaft 36 so that, for example, the user can shift the motorcycle engine E from third to fourth gears as is well known in the art of transmissions.

With reference to FIGS. 2 and 3, the sliding sleeve 56 has gearshift pins 83 which extend out from the sliding sleeve 56 substantially parallel to the gearbox output shaft 40. One end of each of the pins 83 is coupled to the sliding sleeve 56 and the other end extends through the openings 87 in the gear 48. The gearshift pins 83 are also coupled to a claw ring 82. The claw ring 82 is positioned between the gears 48, 50. Claws 84 extend out from the claw ring 82 toward the gear 50. The claws 84 are adapted to be received within the recesses 85 in the gear 50.

In operation, the gearshift fork 64 can move the sliding sleeve 56 along the gearbox output shaft 40 between the gears 46, 48. When the sliding sleeve 56 is moved toward the gear 48, the gearshift pins 83 pass through the openings 87 in the gear 48. The gearshift pins 83 force the claw ring 82 and the claws 84 into the recesses 85 in the gear 50. The position of the claws 84 couple the claw ring 82, the output shaft 40, and the gear 50 for rotation. In this way, the user can shift the motorcycle engine E from, for example, fourth to fifth gears as is well known in the art of transmissions.

Referring now to FIG. 1, an oil intake channel 92 extends through the crankcase upper half 12 and is substantially parallel to one of the openings for the cylinder head fasteners 26. The oil intake channel 92 extends through the first cylinder 14 and first cylinder head 22. Oil or another similar lubricant, is conveyed from the lubrication cycle (not-shown) into the upper crankcase half 12 through the oil intake channel 92.

From the oil intake channel 92, the oil is conveyed to the transverse bore 94. As shown in FIG. 2, the transverse bore 94 extends through the gearbox wall 31 and is substantially parallel with the first longitudinal axis L. Three ducts 96, 98, 100 are arranged along the length of the transverse bore 94. The ducts 96, 98, 100 extend through the gearbox wall 31 so that oil can be conveyed into the gearbox 34 from the lubrication system.

The ducts 96, 98, 100 are positioned so that they can direct oil onto the gearshift forks 64, 66, 68 and the sliding sleeves 54, 56, 60, thereby lubricating the gearshift forks 64, 66, 68, and the sliding sleeves 54, 56, 60. As best seen in FIG. 2, ducts 96, 98 extend through the gearbox wall 31 and are arranged within the gearbox 34 so that they can direct oil onto the gearshift forks 64, 66 and the corresponding sliding sleeves 54, 56. Referring now to FIG. 1, duct 100 also extends through the gearbox wall 31 but is positioned so that the duct 100 can direct oil onto the sliding sleeve 60 and the gearshift fork 68.

Once oil is introduced into the gearbox 34 and the engine E is in operation, oil is flung by the gears 42, 43, 44, 45, 46, 47, 48, 49, 50, 51, the gearbox input and output shafts 36, 40, and the other moving elements within the gearbox 34. Generally, the oil is flung against the gearbox wall 31 when the various elements within the gearbox 34 rotate around the first and second longitudinal axes L, N. Some of this oil contacts the gearbox wall 31 and drains down the gearbox wall 31 into a gearbox sump 33. From the gearbox sump 33, the oil is drained or conveyed out of the gearbox 34 and is returned to the lubrication cycle by an oil evacuation channel (not shown).

Output side and input side ribs 102, 104 (see FIGS. 1 and 2) extend out from the gearbox wall 31 into the cavity 32. The output side rib 102 is substantially parallel with the gearbox output shaft 40 and the input side rib 104 is substantially parallel with the gearbox input shaft 36. The input and output side ribs 104, 102 are positioned inside the gearbox 34 so that they are above the gearbox input and output shafts 36, 40, respectively. In this manner, at least some of the oil which is flung off of the elements within the gearbox 34 is flung onto the output and input side ribs 102, 104. Oil which is flung onto the output and input side ribs 102, 104 is directed by the output and input side ribs 102, 104 onto the gearshift forks 64, 66, 68 and the sliding sleeves 54, 56, 60.

As shown in FIG. 2, projections 106 extend into the cavity 32 from the output and input side ribs 102, 104. The projections 106 help to direct the oil from the ducts 96, 98, 100 onto the gearshift forks 64, 66, 68 and the sliding sleeves 54, 56, 60. Additionally, the projections 106 collect oil flung from the gears 42, 43, 44, 45, 46, 47, 48, 49, 50, 51, the gearbox input and output shafts 36, 37, the sliding sleeves 54, 56, 60, and the other elements within the gearbox 34. The projections 106 direct this oil onto the gearshift forks 64, 66, 68 and the sliding sleeves 54, 56, 60. Because the output and input side ribs 102, 104 are positioned above the gearbox input and output shafts 36, 40, gravity helps to direct the oil so that the oil flows off of the output and input side ribs 102, 104, across the projections 106, and drips onto the gearshift forks 64, 66, 68 and the sliding sleeves 54, 56, 60.

In operation, oil is conveyed into the oil intake channel 92 (see FIG. 1) from the lubrication cycle (not shown). The lubrication cycle preferably includes an oil pump or other lubrication conveying device, an oil sump, and a series of ducts, valves, channels, and the like for distributing lubricant to the oil consuming devices within the engine E. Oil flows from the lubrication system through the oil intake channel 92 and into the transverse bore 94 (see FIG. 2). From the transverse bore 94, the oil is distributed into the gearbox 34 through the ducts 96, 98, 100. The oil flows out of the ducts 96, 98, 100 and across either the output or input side ribs 102, 104. The output and input side ribs 102, 104 then channel the oil onto projections 106. The projections 106 then route the oil onto the gearshift forks 64, 66, 68 and the sliding sleeves 54, 56, 60. In particular, oil is directed onto the sliding sleeve grooves 54a, 56a, 60a. Additionally, some of the oil flung off of the sliding sleeves 54, 56, 60, the gearbox input and output shafts 36, 40 and the gears 42,43, 44, 45, 46, 47, 48, 49, 50, 51 contacts the output and input side ribs 102, 104 and the projections 106. The input and output side ribs and the projections 106 also direct this oil onto the gearshift forks 64, 66, 68 and the sliding sleeves 54, 56, 60.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

For example, while various elements and assemblies of the present invention are described as being used with a manual gearbox 34, the present invention can also be used with other gearboxes 34. One having ordinary skill in the art will appreciate that the present invention can also be used with gearboxes 34 having an H-shape or a shifting-dog pattern as well as with engines E having automatic transmissions.

Similarly, the present invention is described as being used with an liquid-cooled engine E. However, one having ordinary skill in the art would appreciate that the engine E could also be air-cooled. Finally, the present invention is described as using oil to lubricate the engine E. However, one having ordinary skill in the art will appreciate that other lubricants, both synthetic and organic, could be used with equal effectiveness. As such, the functions of the various elements and assemblies of the present invention can be changed to a significant degree without departing from the spirit and scope of the present invention.

What is claimed is:

1. A motorcycle engine comprising:
   a gearbox with a wall defining a cavity, the wall at least partially enclosing the gearbox;
   a shaft extending through the gearbox, the shaft having a longitudinal axis;
   a gear coupled to the shaft to rotate about the longitudinal axis;
   a sliding sleeve coupled to the shaft to rotate with the shaft about the longitudinal axis, the sliding sleeve being adapted to move axially along the shaft;
   a gearshift fork in mating engagement with the sliding sleeve, the gearshift fork being moveable in a direction parallel to the longitudinal axis to move the sliding sleeve axially along the shaft;
   a duct extending through the wall, the duct being in fluid communication with a supply of lubricant and with the cavity, the duct positioned adjacent the sliding sleeve and the gearshift fork to direct the lubricant onto at least one of the sliding sleeve and the gearshift fork; and
   a rib extending from the wall into the cavity, the rib positioned to direct the lubricant from the duct onto the sliding sleeve and the gearshift fork.

2. A motorcycle engine as claimed in claim 1, further comprising:
   an intake channel extending into the wall; and
   a transverse bore within the wall, the transverse bore in fluid communication with the intake channel, the transverse bore in fluid communication with the duct so that the lubricant can flow through the intake channel, the transverse bore, and the duct.

3. A motorcycle engine as claimed in claim 1, further comprising:
   a second sliding sleeve coupled to the shaft to rotate with the shaft about the longitudinal axis, the second sliding sleeve being adapted to move axially along the shaft;
   a second gearshift fork in mating engagement with the second sliding sleeve, the second gearshift fork moveable in a direction parallel to the longitudinal axis to move the second sliding sleeve axially along the shaft; and
   a second duct extending through the wall, the second duct being in fluid communication with a supply of lubricant and the cavity, the second duct positioned adjacent the second sleeve and the second gearshift fork to direct the lubricant onto at least one of the second sliding sleeve and the second gearshift fork.

4. A motorcycle engine as claimed in claim 1, wherein the rib includes a projection extending into the cavity, the projection positioned to direct the lubricant from the rib onto at least one of the sliding sleeve and the gearshift fork.

5. A gearbox comprising:
   a wall defining a cavity, the wall at least partially enclosing the gearbox;
   a shaft extending through the gearbox, the shaft having a longitudinal axis;
   a gear coupled to the shaft to rotate with the shaft about the longitudinal axis;
   a sliding sleeve coupled to the shaft to rotate with the shaft about the longitudinal axis, the sliding sleeve being adapted to move axially along the shaft;
   a gearshift fork in mating engagement with the sliding sleeve, the gearshift fork moveable in a direction parallel to the longitudinal axis to move the sliding sleeve axially along the shaft; and
   a rib extending from the wall into the cavity, the rib positioned so that at least some of a lubricant flung from the shaft, the gear, and the sliding sleeve contacts the rib, the rib being adapted to direct the lubricant onto at least one of the sliding sleeve and the gearshift fork.

6. A gearbox as claimed in claim 5, wherein the rib includes a projection extending into the cavity, the projection positioned so that at least some of the lubricant flung from the shaft, the gear, and the sliding sleeve contacts the projection, the projection adapted to direct the lubricant onto at least one of the sliding sleeve and the gearshift fork.

7. A gearbox as claimed in claim 5, wherein the rib is substantially parallel to the shaft.

8. A gearbox as claimed in claim 5, wherein the rib is contoured to at least partially surround the sliding sleeve.

9. A gearbox as claimed in claim 5, further comprising a duct extending through the wall, the duct in fluid communication with the cavity, the duct positioned so that the duct can direct a second lubricant onto one of the sliding sleeve and the gearshift fork.

10. A gearbox as claimed in claim 9, further comprising:
an intake channel adjacent the gearbox; and
a transverse bore adjacent the wall, the transverse bore in fluid communication with the intake channel, the transverse bore in fluid communication with the duct so that the second lubricant can flow through the intake channel, the transverse bore, and the duct.

11. A method of lubricating a motorcycle engine, the engine having a gearbox with a wall defining a cavity, the wall at least partially enclosing the gearbox, a rib extending from the wall into the cavity, a sliding sleeve coupled to the shaft to rotate with the shaft about a longitudinal axis, the sliding sleeve adapted to move axially along the shaft, a gearshift fork in mating engagement with the sliding sleeve, the gearshift fork moveable parallel to the shaft, the method comprising:
rotating the shaft within the gearbox, the shaft coaxial with the longitudinal axis and rotating about the longitudinal axis;
rotating a gear with the shaft, the gear coupled to the shaft to rotate with the shaft about the longitudinal axis;
rotating the sliding sleeve with the shaft;
flinging a lubricant from at least one of the gear, the shaft, and the sliding sleeve;
collecting at least some of the lubricant on the rib; and
directing the lubricant from the rib onto at least one of the sliding sleeve and the gearshift fork.

12. The method of claim 11, further comprising:
collecting at least some of the lubricant on a projection extending from the rib into the cavity; and
directing the lubricant from the projection onto at least one of the sliding sleeve and the gearshift fork.

13. The method of claim 11, further comprising:
directing a second lubricant through a duct into the cavity; and
lubricating at least one of the sliding sleeve and the gearshift fork with the second lubricant.

14. The method of claim 11, comprising:
directing a second lubricant through a duct into the cavity;
conducting a second lubricant from the duct across the rib; and
lubricating at least one of the sliding sleeve and the gearshift fork with the second lubricant.

15. The method of claim 11, further comprising:
channeling a lubricant through an intake channel;
directing the lubricant through a transverse bore, the transverse bore in fluid communication with the intake channel;
directing the lubricant through a duct into the cavity, the duct in fluid communication with the transverse bore; and
lubricating at least one of the sliding sleeve and the gearshift fork with the lubricant.

* * * * *